Oct. 10, 1961     A. L. BERNSTEIN     3,003,256
FRACTION-ABACUS
Filed Jan. 16, 1961
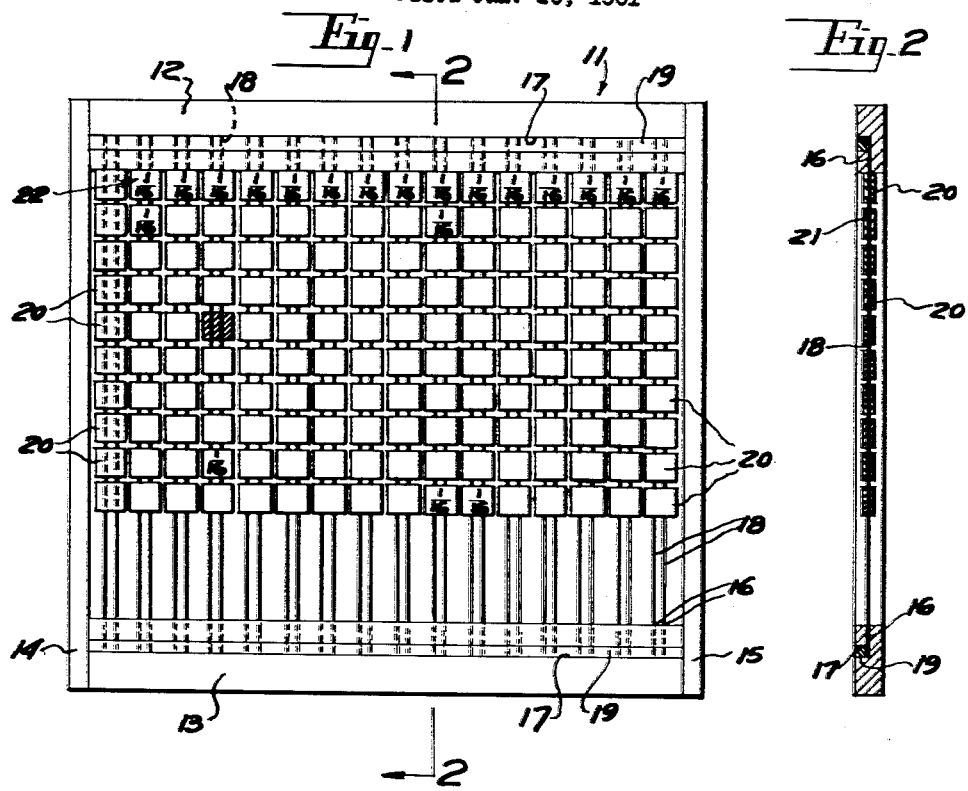
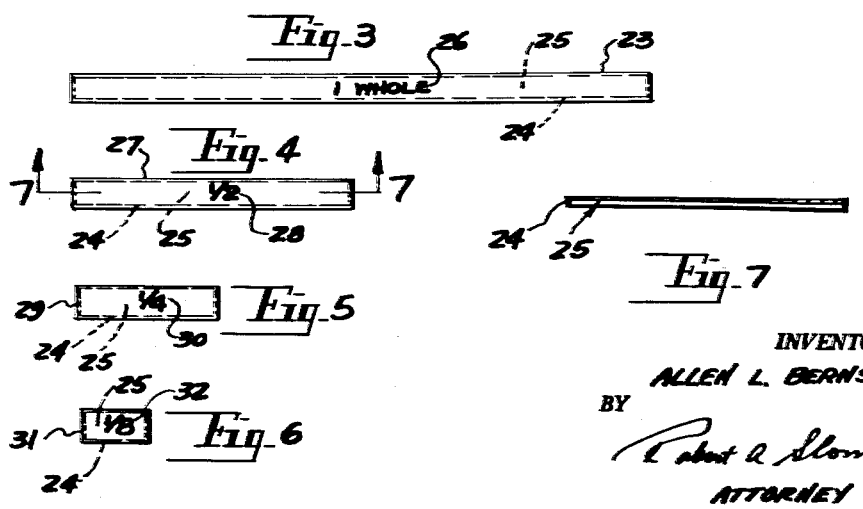
INVENTOR.
ALLEN L. BERNSTEIN
BY
Robert A. Sloman
ATTORNEY

United States Patent Office 3,003,256
Patented Oct. 10, 1961

3,003,256
FRACTION-ABACUS
Allen L. Bernstein, 18307 Shaftsbury, Detroit, Mich.
Filed Jan. 16, 1961, Ser. No. 82,800
5 Claims. (Cl. 35—33)

This invention relates to a fraction abacus and more particularly to an educational device for the teaching and understanding of common fractions and mixed numbers.

It is the object of the present invention to provide a novel form of abacus to assist in the teaching and learning of arithmetic computation with common fractions and mixed numbers.

It is a further object of the present invention to provide a fraction abacus for school children which permits physical manipulations of the fraction number symbols in order to bridge the educational gap in learning from the abstract symbol to the reality and its basic concept.

It is a further object of the present invention to provide a form of abacus consisting of a hollow frame which has mounted there across a series of spaced pairs of parallel spaced wires with their respective ends secured to the frame and with a series of longitudinally spaced blocks with pairs of apertures therethrough to cooperatively receive the corresponding pair of wires by which the said blocks may be slidably mounted upon the corresponding pair of wires and with a fraction indicia formed upon the outer face of each block.

It is a further object of the present invention to provide upon the outer surface of each block an indicia in the nature of a unit fraction of a whole number, and with the number of blocks in a row extending transversely of the length of the wires upon which the blocks are mounted corresponding to the denominator of the said fraction.

It is a further object of the present invention to provide a series of recessed caps of different lengths, adapted to respectively span and retainingly engage multiples of adjacent transversely registering blocks, whereby said blocks are adapted for longitudinal adjustment in unison upon their respective mounting wires.

It is a further object of the present invention to provide a novel means of mounting the blocks restraining the same against rotation.

These and other objects will be seen from the following specification and claims in conjunction with the appended drawings in which:

FIG. 1 is a front elevational view of the present fraction abacus.

FIG. 2 is a section taken on line 2—2 of FIG. 1.

FIG. 3 is a plan view of a recessed cap adapted for spanning and retainingly engaging a complete laterally related series of blocks to form a whole unit.

FIGS. 4, 5 and 6 are similar views of caps corresponding to FIG. 3, but of different lengths representing multiples of said blocks.

FIG. 7 is a section taken on line 7—7 of FIG. 4.

It will be understood that the above drawing illustrates merely a preferred embodiment of the invention and that other embodiments are contemplated within the scope of the claims hereafter set forth.

Referring to the drawing, and particularly FIGS. 1 and 2, the present fraction abacus consists of a hollow rectangular frame generally indicated at 11, including a first pair of spaced rails 12 and 13, which may be regarded as top and bottom rails, and a second pair of laterally spaced rails 14—15 extending at right angles to the rails 12 and 13.

For illustration, the frame may be constructed of aluminum or wood. Each of the first pair of rails 12 and 13 have formed in their inner opposing surfaces and extending thereinto a series of pairs of spaced apertures 16. Each of the rails 12 and 13 has formed in its outer surface an elongated slot 17, which communicates with the inner ends of the series of pairs of slots 16.

A series of spaced pairs of parallel spaced wires 18 are positioned within the frame 11, with their respective opposite ends spanning rails 12 and 13 and respectively projected through the pairs of apertures 16 therein and extending into the above described elongated slots 17, forming a part of the said rails 12 and 13.

An elongated retainer strip 19, of a cross sectional shape corresponding to the cross sectional shape of the respective slots 17 is nested and secured down into the said slot 17 and operatively engages ends of the respective wires 18 for effectively anchoring the same with respect to rails 12 and 13.

The above described method of securing wire ends within the rails 12 and 13 is merely by way of illustration of one preferred method of so doing. It is contemplated that the elongated wires 18 may be secured to the respective rails 12 and 13 in any other suitable manner which produces the effect of retaining the ends of the said wires with respect to and within the plane of the frame 11.

For illustration, the retainer strips 19 may be pressed tightly into the slots 17 for anchoring purposes or alternately be pressed therein and at the same time adhesively secured therein or glued therein for the primary purpose of anchoring the wire ends with respect to the said rails 12 and 13.

In the preferred embodiment of the invention there are 36 lengths of wire which may be piano wire, for illustration.

A series of longitudinally spaced blocks 20, each having a pair of spaced apertures extending therethrough to receive the respective spaced pairs of wires 18, are mounted upon the said pairs of wires and are adapted for manual sliding adjustment thereon relative to the rails 12 and 13. For illustration, upon each pair of wires 18 there are mounted a series of 10 longitudinally spaced blocks with each block having a pair of apertures therethrough, one to receive each of the wires 18 to thus slidably mount the said blocks upon the pair of wires and to restrain the blocks against rotation out of the plane of the frame. The respective apertures extending centrally through each of the blocks are designated at 21, FIG. 2, the said apertures being of such size as to permit sliding adjustment with the blocks upon the pairs of wires 18.

It is contemplated that the blocks may be free for sliding movements upon the said wires 18 or upon the other hand may be of such size that the blocks frictionally engage the respective wires so as to be restrained against accidental dislodgment from a particular position of adjustment. It is noted that the respective blocks of each series of blocks on a particular pair of wires are adapted for transverse registry with corresponding blocks on all the other series of blocks on the other pairs of wires 18.

Suitable indicia 22 are formed upon the exterior surfaces of each of the blocks 20, said indicia in each case being the same. For example, the indicia may be marked 1/16 in each case, as shown in the preferred embodiment of the invention, though it is contemplated that any other suitable indicia may be employed as a unit fraction of a whole number, and within the number of blocks in a row extending transversely of said wires corresponding to the denominator of the particular fraction selected.

FIGS. 3 through 7 show a series of caps of different lengths, which are recessed in their undersurfaces and are adapted to respectively span and retainingly engage multiples of the adjacent transversely registering blocks 20 by which such series of blocks retained by the said caps may be longitudinally adjusted in unison upon their respective mounting wires 18.

For illustration, FIG. 3, cap 23, of a thin aluminum or plastic stock, has upon its undersurface a continuous marginal flange 24 to thereby define in the undersurface of said cap an elongated rectangular recess 25, which is adapted to receive upper surface portions of a complete transverse row of blocks 20, said blocks being one on each of the series of pairs of wires 18.

The cap 23 has an indicia 26 marked thereon indicated "1" whole and is adapted to span all of the 16 transversely extending blocks 20 to thus provide a whole unit for movement in unison upon the respective mounting wires 18.

In FIG. 4, there is shown a similar cap 27 whose recess 25 in its undersurface is of a height corresponding substantially to the height of the respective blocks 20 and whose length corresponds to the length encompassed by a series of transversely adjacent blocks 20, including the spacing therebetween, for 8 of such blocks, for illustration.

In this case the indicia 28 is shown as a fraction ½. Accordingly with the cap 27 in place over 8 adjacent blocks 20, these 8 blocks may be moved in unison with respect to their individual support wires 18. The cap 29 is of a similar construction as cap 23 and has an indicia 30 thereon indicating ¼ so that its recess 25 is adapted to cooperatively receive 4 transversely adjacent blocks 20 for movement as a unit. Likewise, the cap 31, shown in FIG. 6 carries the indicia 32, corresponding to ⅛ fraction, adapted to span a pair of laterally adjacent blocks 20, for movement in unison.

Thus the indicia 26, 28, 30 and 32 on the said caps, shown in FIGS. 3, 4, 5, and 6 ranges respectively from a fraction to a whole unit, as in FIG. 3, with the denominators of the said fractions being in effect multiples of the denominators of the indicia upon the corresponding transversely adjacent blocks to be spanned thereby.

In the preferred embodiment of the invention, the blocks are formed from bar stock aluminum or plastic and are approximately ½ inch by ½ inch by ⅛ inch in size with the apertures 21 bored through the ⅛ inch dimension. Accordingly in the preferred embodiment of the invention there are 10 blocks 20 upon each pair of wires 18 and there are provided 16 pairs of wires 18 corresponding to the denominator of the indicia 22 on each of the said blocks in the preferred embodiment of the invention.

For illustration, if the indicia read ⅛ instead of 1/16, then there would be 8 pairs of wires 18 with a corresponding series of transversely aligned 8 blocks. Upon each of the pairs of wires it is noted in the preferred embodiment that there are 10 longitudinally spaced blocks to thus make a total in the preferred embodiment of 160 units or 160 blocks.

It is contemplated however, in the present invention that more than 10 of the said blocks 20 could be mounted on the pairs of wires 18. The primary purpose of the caps shown in FIGS. 3 and 6 provide a conversion of the lowest fractions visually, and thus at the same time permit simultaneous movement of the converted fraction, as above described.

The conversions will change the 1/16 units to a single ⅛ unit, when using the cap of FIG. 6. The cap in FIG. 5 will convert four 1/16 units to a single ¼ unit. The cap in FIG. 4, will convert eight 1/16 units to a single ½ unit, whereas the cap shown in FIG. 3 will convert sixteen of the 16th units to one whole unit.

Having described my invention, reference should now be had to the following claims.

I claim:

1. A fraction abacus comprising a hollow rectangular frame including a pair of spaced rails, a series of spaced pairs of parallel spaced wires positioned within the frame with their respective opposite ends spanning and secured to said rails, a series of longitudinally spaced blocks apertured therethrough to receive and mounted upon each pair of wires, adapted for manual sliding adjustment thereon relative to said rails with the respective blocks in each series of blocks adapted for transverse registry with corresponding blocks in all the other series of blocks, indicia formed upon the outer face of these blocks, said rails in their inner opposing surfaces having formed therein a series of pairs of spaced apertures receiving the respective opposite ends of said wires, there being an elongated slot formed in the upper surface of said rails communicating with the inner ends of said series of pairs of spaced apertures and extending at right angles thereto, and a retainer strip nested and secured in each of said slots retainingly engaging said wires.

2. A fraction abacus comprising a hollow rectangular frame including a pair of spaced rails, a series of spaced pairs of parallel spaced wires positioned within the frame with their respective opposite ends spanning and secured to said rails, a series of longitudinally spaced blocks apertured therethrough to receive and mounted upon each pair of wires, adapted for manual sliding adjustment thereon relative to said rails, with the respective blocks in each series of blocks adapted for transverse registry with corresponding blocks in all the other series of blocks, indicia formed upon the outer face of these blocks, a series of caps of different lengths recessed in their undersurfaces to respectively span and retainingly engage multiples of adjacent transversely registering blocks, adapted for longitudinal adjustment in unison upon said respective mounting wires.

3. A fraction abacus comprising a hollow rectangular frame including a pair of spaced rails, a series of spaced pairs of parallel spaced wires positioned within the frame with their respective opposite ends spanning and secured to said rails, a series of longitudinally spaced blocks apertured therethrough to receive and mounted upon each pair of wires, adapted for manual sliding adjustment thereon relative to said rails, with the respective blocks in each series of blocks adapted for transverse registry with corresponding blocks in all the other series of blocks, indicia formed upon the outer face of these blocks, a series of caps of different lengths rectangularly recessed in their undersurfaces to respectively span and retainingly engage multiples of adjacent transversely registering blocks adapted for longitudinal adjustment in unison upon said respective mounting wires, said blocks being rectangular in shape.

4. A fraction abacus comprising a hollow rectangular frame including a pair of spaced rails, a series of spaced pairs of parallel spaced wires positioned within the frame with their respective opposite ends spanning and secured to said rails, a series of longitudinally spaced blocks apertured therethrough to receive and mounted upon each pair of wires, adapted for manual sliding adjustment thereon relative to said rails, with the respective blocks in each series of blocks adapted for transverse registry with corresponding blocks in all the other series of blocks, indicia formed upon the outer face of these blocks, said indicia being a unit fraction of a whole number and with the number of blocks in a row extending transversely of said wires corresponding to the denominator of said fraction, and a series of caps of different lengths recessed in their under surfaces to respectively span and retainingly engage multiples of adjacent transversely registering blocks adapted for longitudinal adjustment in unison upon said respective mounting wires, the height of said recess corresponding to the height of said block, and the length of said recess being multiples of the denominators of said fractions, plus the lateral spacing between said blocks.

5. A fraction abacus comprising a hollow rectangular frame including a pair of spaced rails, a series of spaced pairs of parallel spaced wires positioned within the frame with their respective opposite ends spanning and secured to said rails, a series of longitudinally spaced blocks apertured therethrough to receive and mounted upon each pair of wires, adapted for manual sliding adjustment thereon relative to said rails with the respective blocks in each series of blocks adapted for transverse registry with corresponding blocks in all the other series of blocks, indicia formed upon the outer face of these blocks, a series of caps of different lengths recessed in their undersurfaces to respectively span and retainingly engage multiples of adjacent transversely registering blocks adapted for longitudinal adjustment in unison upon their respective wires, and indicia formed upon each cap ranging respectively from a fraction to a whole unit with the denominators of said latter fractions being multiples of the denominators of the indicia upon said blocks respectively.

References Cited in the file of this patent

UNITED STATES PATENTS

| | | |
|---|---|---|
| 826,732 | Monachimoff | July 24, 1906 |
| 1,174,689 | Coleman | Mar. 7, 1916 |
| 1,471,437 | Wood | Oct. 23, 1923 |
| 2,556,501 | Limyr | June 12, 1951 |
| 2,844,890 | Oliver et al. | July 29, 1958 |

FOREIGN PATENTS

| | | |
|---|---|---|
| 179,113 | Austria | July 26, 1954 |